US011005710B2

(12) United States Patent
Garg et al.

(10) Patent No.: US 11,005,710 B2
(45) Date of Patent: May 11, 2021

(54) DATA CENTER RESOURCE TRACKING

(71) Applicant: Microsoft Technology Licensing, LLC, Redmond, WA (US)

(72) Inventors: Mohit Garg, Redmond, WA (US); Benjamin M. Schultz, Bellevue, WA (US); Poornananda R. Gaddehosur, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 437 days.

(21) Appl. No.: 14/928,903

(22) Filed: Oct. 30, 2015

(65) Prior Publication Data

US 2017/0054654 A1 Feb. 23, 2017

Related U.S. Application Data

(60) Provisional application No. 62/206,726, filed on Aug. 18, 2015.

(51) Int. Cl.
*H04L 12/24* (2006.01)
*H04L 12/26* (2006.01)

(52) U.S. Cl.
CPC ...... *H04L 41/0813* (2013.01); *H04L 43/0817* (2013.01)

(58) Field of Classification Search
CPC ..... H04L 49/70; H04L 41/0816; H04L 47/80; H04L 45/72; H04L 45/74; H04L 63/20; H04L 63/10; H04L 63/123; H04L 47/20; H04L 41/0893; H04L 63/0876; H04L 49/354

See application file for complete search history.

(56) References Cited

U.S. PATENT DOCUMENTS 7,814,495 B1 10/2010 Lim et al.
8,281,305 B2 10/2012 Otani
(Continued)

FOREIGN PATENT DOCUMENTS

CN 102118798 A 7/2011
CN 103890714 A 6/2014
(Continued)

OTHER PUBLICATIONS

"Second Written Opinion Issued in PCT Application No. PCT/US2016/045444," dated Feb. 28, 2017, 8 Pages.
(Continued)

*Primary Examiner* — Philip J Chea
*Assistant Examiner* — Mohammed Ahmed
(74) *Attorney, Agent, or Firm* — Workman Nydegger

(57) ABSTRACT

Disclosed herein are systems, methods, computer media, and apparatuses for providing resource tracking, such as in a data center environment. A control and monitoring node receives updates indicating instantiation of resources in the computing system network. The control and monitoring node determines that there are duplicate resources in the network, and then determines which of the duplicate resources to provide connectivity to. The control and monitoring node provides network configuration updates to various networking resources in the network to provide network connectivity to the one of the duplicate resources in the network.

20 Claims, 3 Drawing Sheets

(56) References Cited

U.S. PATENT DOCUMENTS

| | | |
|---|---|---|
| 8,799,419 B1 | 8/2014 | Lin et al. |
| 8,799,477 B2 | 8/2014 | Burckart et al. |
| 8,949,827 B2 | 2/2015 | Becker et al. |
| 9,047,109 B1 | 6/2015 | Wang et al. |
| 9,052,963 B2 | 6/2015 | Chang et al. |
| 9,058,199 B2 | 6/2015 | Tsirkin |
| 2007/0038959 A1* | 2/2007 | Bertram .................. G06F 9/451 715/846 |
| 2008/0043756 A1 | 2/2008 | Droux et al. |
| 2009/0055531 A1* | 2/2009 | Brown ................ H04L 63/1416 709/225 |
| 2010/0070870 A1* | 3/2010 | Halperin ................ G06F 16/954 715/742 |
| 2010/0169253 A1* | 7/2010 | Tan ....................... G06F 9/5088 706/21 |
| 2010/0319004 A1 | 12/2010 | Hudson et al. |
| 2012/0054409 A1 | 3/2012 | Block et al. |
| 2012/0079562 A1* | 3/2012 | Anttila .................... G06F 21/51 726/3 |
| 2012/0084445 A1 | 4/2012 | Brock et al. |
| 2012/0311575 A1 | 12/2012 | Song |
| 2013/0031544 A1 | 1/2013 | Sridharan et al. |
| 2013/0055242 A1 | 2/2013 | Tsirkin et al. |
| 2013/0064102 A1* | 3/2013 | Chang ..................... H04L 49/70 370/244 |
| 2013/0064137 A1* | 3/2013 | Santoso ................. H04L 49/70 370/254 |
| 2013/0086298 A1 | 4/2013 | Alanis et al. |
| 2014/0007094 A1 | 1/2014 | Jamjoom et al. |
| 2014/0040893 A1 | 2/2014 | Karve et al. |
| 2014/0282518 A1 | 9/2014 | Banerjee |
| 2015/0146716 A1* | 5/2015 | Olivier ................ H04L 65/1016 370/352 |
| 2015/0178109 A1* | 6/2015 | Li ....................... G06F 9/45558 718/1 |
| 2015/0200808 A1* | 7/2015 | Gourlay .................. H04L 49/70 709/225 |

FOREIGN PATENT DOCUMENTS

| | | |
|---|---|---|
| CN | 104468803 A | 3/2015 |
| WO | WO2015075272 | 5/2015 |

OTHER PUBLICATIONS

Singh, et al., "Virtual Machine Migration Policies in Clouds", In International Journal of Science and Research, vol. 2 Issue 5, May, 2013, pp. 364-367.

PCT Search Report dated Oct. 18, 2016 for PCT applicaton No. PCT/US2016045444, 12 pages.

"International Preliminary Report on Patentability Issued in PCT Application No. PCT/US2016/045444", dated Jun. 6, 2017, 9 Pages.

"Office Action Issued in Chinese Patent Application No. 201680048752.2", dated Nov. 12, 2020, 8 Pages.

"First Office Action and Search Report Issued in Chinese Patent Application No. 201680048752.2", dated Mar. 16, 2020, 13 Pages.

\* cited by examiner

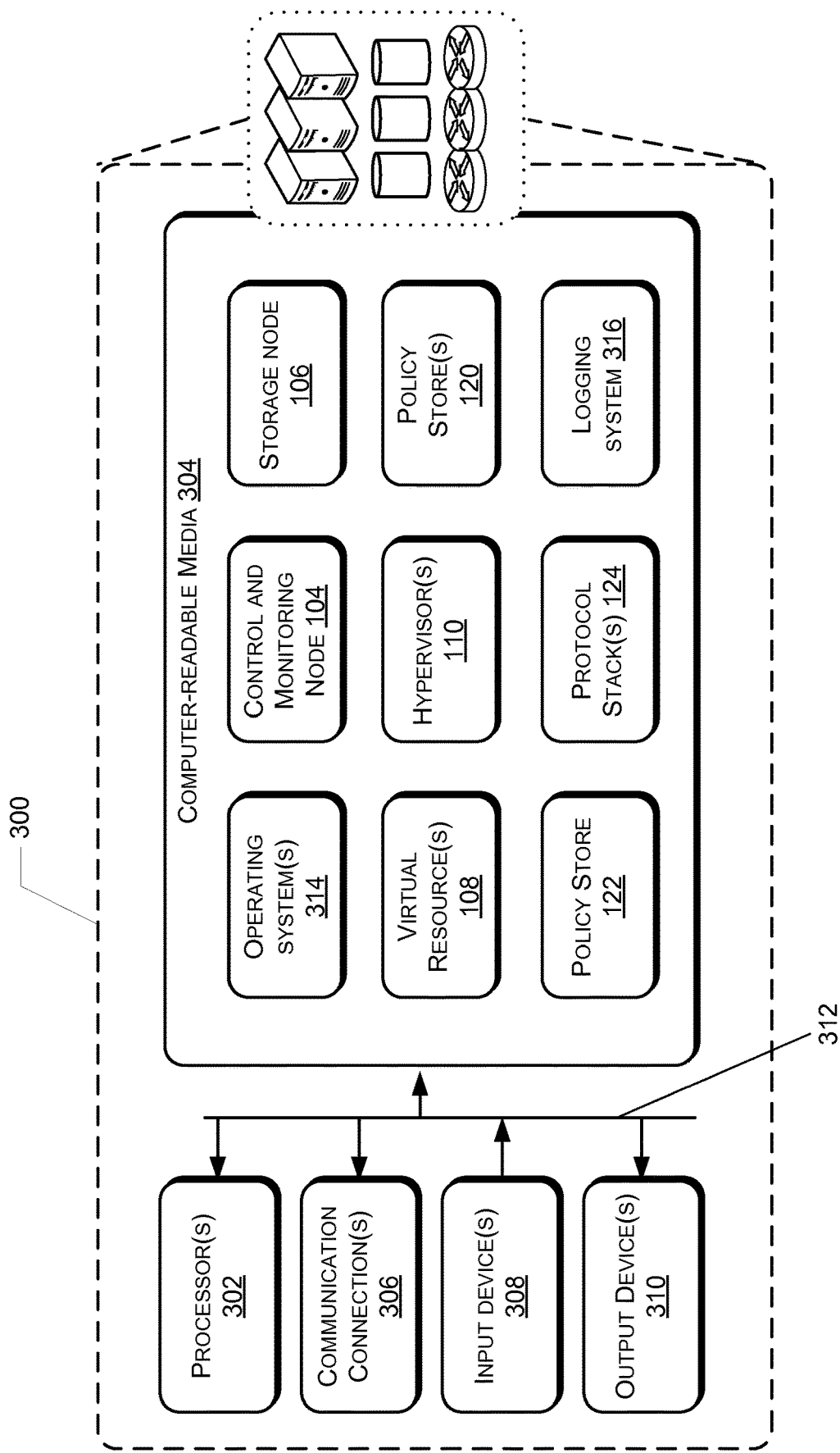

DATA CENTER RESOURCE TRACKING

RELATED APPLICATION

This application claims priority to U.S. Provisional Application No. 62/206,726, filed Aug. 18, 2015, entitled "Data Center Resource Tracking," the entire contents of which are hereby incorporated herein in their entirety.

BACKGROUND

In a data center environment, inventory tracking techniques may be used for each physical piece of equipment, such as servers, network appliances, storage appliances, and so forth. A physical device has an asset tag attached to it and a change of location can be tracked based on disconnecting and reconnecting of the equipment to the cable infrastructure for power, networking, and storage. In a virtualized computing environment, virtual machines and virtual networking functions are decoupled from the physical infrastructure. Tracking the locations of virtual machines may be based on a physical tag system, although migration of virtual machines makes use of such resource tracking mechanisms difficult in a modern data center environment. This is in part because virtual machines are moved without physically disconnecting and connecting devices from the cable infrastructure.

Networking policies applied to physical or virtual networking functions enables virtual machines to maintain the designated connectivity to data center resources as well as to the external environment, such as the Internet. The networking policies include such things as firewall rules, access control lists, network encapsulation functions, address mappings, and other networking rules that apply to the virtual machines within the data center. Different virtual machines may have different applicable networking policies.

BRIEF SUMMARY

This Summary is provided in order to introduce simplified concepts of the present disclosure, which are further described below in the Detailed Description. This summary is not intended to identify essential features of the claimed subject matter, nor is it intended for use in determining the scope of the claimed subject matter.

Examples of the present disclosure provide systems, methods, and apparatuses for tracking virtual resources, such as virtual machines, clusters of virtual machines, application containers, and virtual networking appliances (which may be implemented as virtual machines, clusters of virtual machines, application containers, etc.). Examples identify duplicate virtual resources, determine which duplicates to provide network connectivity to, and apply networking policies accordingly.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

FIG. 3 is a block diagram of an example computing system usable to implement virtual resource monitoring and networking policy updates.

DETAILED DESCRIPTION

Figure 1:
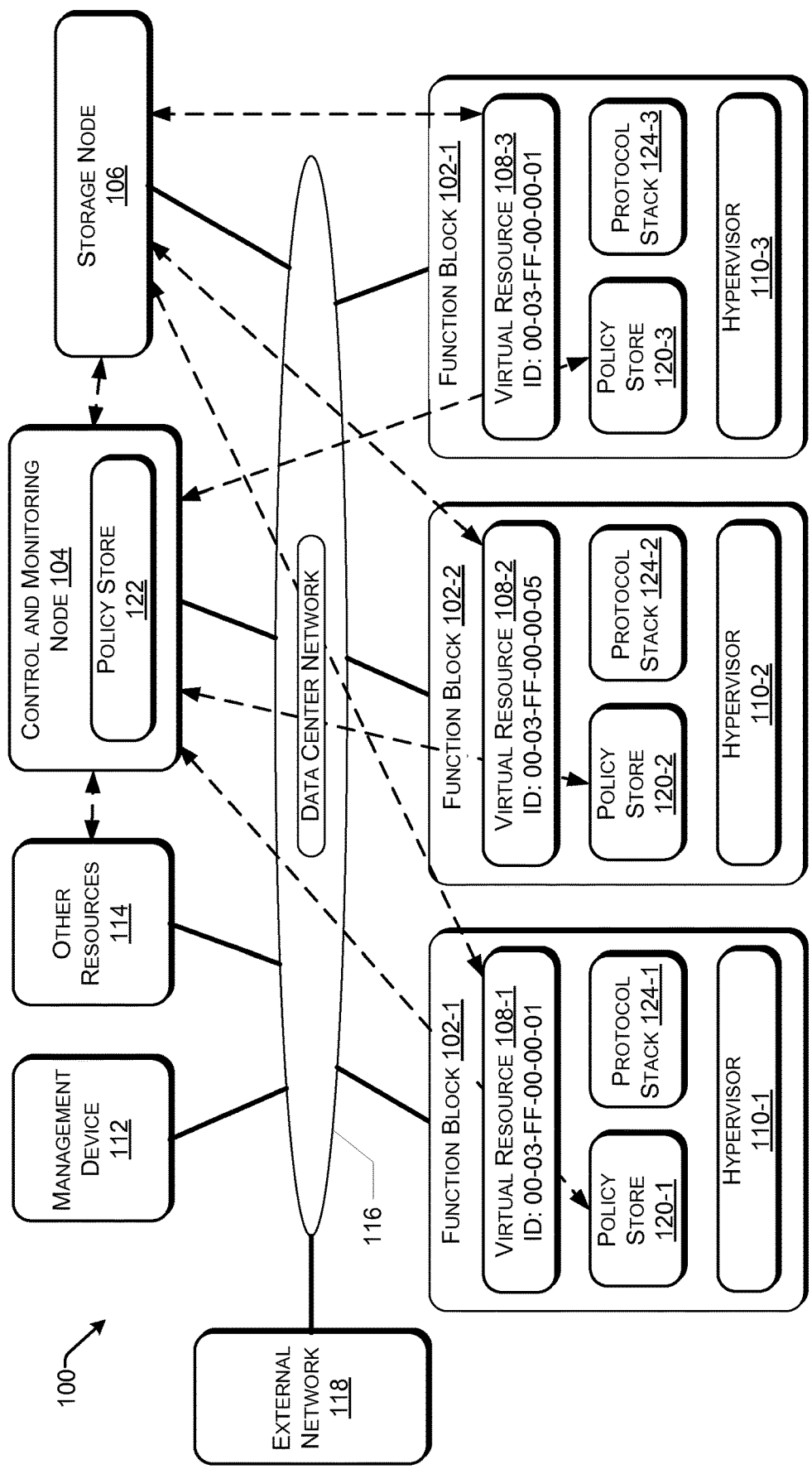
FIG. 1 is a schematic diagram that illustrates an example environment for virtual resource tracking and networking policy updates.

In a datacenter, virtual resources, such as virtual machines (VMs), VM clusters, application containers, and so forth, may be moved to a different physical resource by various underlying virtualization technologies like Hyper-V® migration, host clustering, guest clustering, and others. The networking policies associated with the virtual resources are also updated to ensure that the underlying network infrastructure maintains connectivity for the virtual resources. In theory, when a virtual resource moves, the source (or original) virtual resource is deleted and the destination virtual resource remains in the network. Because of transient conditions that may exist in the network, a move of a virtual resource is sometimes not successful. Thus, there are scenarios in which multiple instances of virtual resources that have the same virtual resource identifier are present in the network. Networking connectivity to the virtual resources relies on there being unique virtual resource identifiers for each virtual resource. Therefore, having more than one virtual resource with the same virtual resource identifier results in ambiguity in determining which virtual resource is to be provided with networking connectivity.

Examples of the present disclosure provide systems, methods, and apparatuses for tracking virtual resources, such as virtual machines, groups of virtual machines (such as clusters of virtual machines), application containers, and virtual networking appliances (which may be implemented as virtual machines, clusters of virtual machines, application containers, etc.). Examples identify duplicate virtual resources, determine which duplicate (i.e., which instance) to provide network connectivity to, and apply networking policies accordingly. Where clusters of virtual machines are tracked, in some examples, the cluster identifiers are tracked, while in some examples the individual virtual resource identifiers of the individual virtual resources within the cluster are tracked.

When moving a virtual resource, an underlying virtual resource control system sends a port-add notification to the new host machine to which the virtual resource is being moved and a port-delete notification to the old host machine from which the virtual resource is being moved. The port-add and port-delete notifications may be stored in policy stores on each host machine. Tracking of the virtual resources includes, in some examples, receiving by a control and monitoring node these port-add or port-delete notifications, such as from the host machines themselves (e.g., from a computing system on which a virtual resource is instantiated), from the underlying virtual resource control system, or from some other device. These notifications may be sent via a secured and authenticated communication channel.

Due to network issues, one or more hosts may not be reachable to delete the port profiles (to delete the virtual resources) or to provide the control and monitoring node with updates. The result is a set of scenarios (some of which are discussed elsewhere within this Detailed Description) in which multiple instances of a virtual resource having the same virtual resource identifier are present in the network for an extended period of time, which may in some circumstances be hours or days. The control and monitoring node may therefore see multiple instances of the virtual resources having the same virtual identifier. The control and monitoring node according to examples of the present application determines a virtual resource instance to be a candidate virtual resource instance to provide with networking connectivity. The candidate virtual resource instance is the virtual resource instance that, based on the current state and policies in the network at a given time, is determined to most likely to provide (or be able to provide) functionality to end users, other resources within the data center environment, and/or external resources outside of the data center environment. Based on this determination, the control and monitoring node maps the networking policies that apply to the virtual resource to the host machine that hosts the candidate virtual resource instance or, in some examples, to a group of virtual resources as discussed in more detail elsewhere within this Detailed Description. As notifications are later received from other hosts indicating that those hosts include another instance of the virtual resource, the control and monitoring node ensures that networking policies stick to the candidate virtual instance such as by re-determining the candidate virtual resource instance.

In examples described herein, the control and monitoring node maintains a policy store that indicates the virtual resources in the network. Where two or more instances of the virtual resources having the same virtual resource identifier are instantiated in the network, the policy includes two instances of the same virtual resource identifier. In examples, the control and monitoring node utilizes policy store information, such as virtual resource identifiers, virtual resource port versions, and virtual resource state information, to identify the candidate virtual resource.

In some examples, the control and monitoring node utilizes port versions, for example the most recently added port version, to determine the virtual resource instance to provide networking connectivity to. Port versions may be essentially any computer-readable identifier, including e.g., alphanumeric identifiers, timestamps, and so forth. When a virtual resource is first instantiated, it is assigned an initial port version. When a virtual resource is migrated, moved, failed-over, or more generally whenever a virtual resource instance having the same virtual resource identifier as another virtual resource instance is detected in the network, a new port version is assigned to the newly detected virtual resource instance. In some examples, port versions may be assigned in a determinable order, such that an order in which two or more port versions were assigned can be determined after the fact. In some examples, the port version may be used to identify the virtual resource instance to which to provide networking connectivity. In some examples, the control and monitoring node utilizes the state information to identify the candidate virtual resource. The state information includes, in some examples, an indicator of whether the virtual resource is running or is in some other state, such as a critical state, which may be based on whether the virtual resource is able to access storage, although other state information may also be used. In some examples, the control and monitoring node utilizes both the port version and the state information to identify the virtual resource instance to provide networking connectivity to.

In some examples, information regarding one of the port version or the state of a virtual resource instance by itself may be less useful in attempting to determine the candidate virtual resource instance than having information regarding both. For example, a later-instantiated virtual resource instance may have the most recently assigned port version, but if it is in a non-running state, then it may not be a good candidate virtual resource instance. And due to certain network conditions, there may be more than one virtual resource instance with the same virtual resource identifier that is in, or shown in the policy store to be in, a running state. Therefore, in some examples, multi-dimensional information such as virtual resource state and virtual resource port versions are utilized together to determine the candidate virtual resource instance.

Examples of the present disclosure therefore provide for faster recovery from network failures, improved network connectivity during transient issues in the virtualization environment, as well as reduced periods during which virtualized resources within a data center environment are unavailable, either to end users or to other network elements in the data center network or in an external network.

For the sake of completeness, several scenarios will be now described in which race conditions between two virtual resource instances are resolved by a control and monitoring node. The first set of scenarios involves failed virtual resource migration. Some VM implementations, such as Microsoft® Hyper-V®, as well as others, enable migration either with or without storage migration. VM storage can be present locally, on the same host machine on which the VM is instantiated. Hyper-V® provides a way to migrate the VM to another host along with its local storage. In some situations, the migration may fail, and the storage may be copied over successfully. In these situations, the old and the new VM instances may successfully enter a running state with their own local storage copies. Thus, the policy in the control and monitoring node may show two VM instances with the same virtual resource identifier in a running state. The control and monitoring node may identify a candidate VM instance to provide connectivity to based at least in part on port version information. Because both VM instances may be shown as being in a running state, the port version may be used to determine the candidate VM to provide connectivity to, in some examples.

In addition to local storage, VMs may also access storage on a remote share. In a Hyper-V® migration situation, the VM is moved to a new host and the storage (e.g., the remote share) does not move. If migration fails in this situation, then a single instance of the VM is able to access the remote storage at any point in time using the same credentials. Thus, one of the VMs enters a running state, which is reflected in the policy store on the control and monitoring node. The control and monitoring node may select a candidate VM to provide connectivity to based at least in part on state information. Because one of the two VMs is in a running state, the VM in the running state may be selected to provide connectivity to, in some examples.

Another set of scenarios involves virtual resource clustering. Virtual resource clustering provides infrastructure features that ensure applications remain highly available. A cluster node is a machine that hosts virtual resources, including applications and services. If the cluster node requires some maintenance, or the cluster node fails, then the virtual resources on the cluster node are migrated to another available cluster node in a process known as failover. In a planned maintenance situation, a migration process—such as Hyper-V® migration—moves the virtual resources over. This migration is initiated by a clustering service, which makes it different than a standalone Hyper-V® migration. In some rare cases, multiple VM instances are present on different hosts, with one or more of them in a turned off state. A clustering service would then arbitrate between the VMs. But the control and monitoring node may show in its policy store that some or all of the VMs are not in a running state. The control and monitoring node may select a candidate VM to provide connectivity to based at least in part on port version information. Because one or more of the VMs appear to be in a non-running state, port version information may be used to identify the VM, or group of VMs (e.g., cluster) to which to provide connectivity, in some examples.

Failover is the unplanned move of a VM cluster. If the machine hosting the cluster loses clustering connectivity, and the clustering service controller moves the VMs to another machine, then the host machine that loses connectivity turns one or more of the VMs off, and the new VMs appear on the new host. The VMs on the machine that loses connectivity are turned off when VM resiliency is disabled. VM resiliency is a feature designed to deal with a transient intra-cluster connectivity communication failure. In a transient communication failure, the clustering service may turn the VMs into an off state, and activate new VMs on a new host machine. This may be inefficient because the time it takes to instantiate the new VMs may be longer than the time it takes for the transient network communication to be corrected. Since information regarding whether a communication failure is a transient failure may not be available, VM resiliency enables the VM on the host that loses connectivity to remain in an "isolated" state for a period of time. The VMs continue to run as long as they have connectivity to a storage node, such as via server message block (SMB). If the node that loses cluster connectivity fails to reconnect with the cluster after a configurable amount of time (such as four minutes, although other times may be used), the cluster brings up another VM on another host machine. The cluster service then increments (or otherwise assigns a new) SMB connection to the newly instantiated VM instance, thereby giving the newly instantiated VM instance access to storage and terminating the old VM instance's access to storage. When this occurs, the old VM goes into a critical-stopped mode. But, notably, the old VM does not recognize that its connectivity to storage is terminated until it performs an I/O operation to the storage node. Thus, the old VM may not enter the critical-stopped state until it performs an I/O, and both the old and the new VM instance may be in the running state concurrently for a period of time. The control and monitoring node may select candidate VMs to provide connectivity to based at least in part on port version information. Because one or more of the VMs appear to be in a running state, port version information may be used to identify the VM, or group of VMs (e.g., cluster) to which to provide connectivity, in some examples.

Another set of scenarios includes virtual resource duplication. For example, Hyper-V® includes an option to duplicate a VM on another host. The original VM instance and the duplicate instance may have the same virtual resource identifiers, and a user could turn one or more of them on, thereby causing more than one VM to enter into a running state if the storage service allows it. These multiple VMs may show up in the control and monitoring node's policy store as having the same virtual resource identifier and as being in a running state. The control and monitoring node may select candidate VMs to provide connectivity to based at least in part on port version information. Because one or more VMs appear to be in a running state, port version information may be used to identify the VM, or group of VMs (e.g., cluster) to which to provide connectivity, in some examples.

FIG. 1 is a schematic diagram that illustrates an environment 100 for virtual resource tracking and networking policy updates. Environment 100 includes a plurality of function blocks 102, a control and monitoring node 104, and a storage node 106 (e.g., a virtual hard drive (VHD)). Function blocks 102 include one or more physical machines (e.g., computing systems) that include one or more virtual resources 108. Virtual resources 108 may include, in various examples, VMs, application containers, software container, clusters of VMs, and so forth. An application container or software container may be a stateless, lightweight operating system level virtualization environment. The application or software container includes the application and a minimal set of operating system components needed for the application to execute. The virtual resources 108 may include operating system elements and application elements. The virtual resources 108 may include or provide application resources, such as web servers, search engines, database servers, and essentially any network-accessible application resource. The virtual resources 108 may include virtual network appliances, such as may be provided by software-defined networking (SDN), virtual networking functions (VNF), and so forth. The virtual resources 108 may execute under the control of hypervisors 110, or under some other virtualization technology. One or more of the function blocks 102 may include networking hardware, such as layer-2 switches that provide connectivity for the function blocks 102. In other examples, the virtual resources 108 of the function blocks 102 may include virtualized networking appliances.

Environment 100 also includes one or more management devices 112, from which a user may access the control and monitoring node 104. The environment 100 also includes other resources 114, which may include networking equipment, such as conventional and/or legacy networking equipment (such as routers, firewalls, switches, bridges, etc.) that are not virtualized, various monitoring devices, climate control systems, power equipment (e g, uninterruptable power supply (UPS) equipment), and so forth. The environment 100 also includes an underlying data center network 116, which may include physical infrastructure such as wiring, hubs, interconnects, routers, switches, etc., and may conceptually include in some examples virtual network appliances deployed as function blocks 102 and various ones of the other resources 114. Thus, in some embodiments, one or more of the virtual resources 108 instantiated on the function blocks 102 provide networking infrastructure functions and are part of underlying infrastructure of the data center network 116. While other ones of the virtual resources 108 instantiated on the function blocks 102 provide application services (such as web servers, email servers, etc.) to end-users or application services (e.g., database servers) to other function blocks 102. An external network 118, such as the public Internet, may also be present. The external network 118 may be accessible to the various elements of the environment 100, such as via the data center network 116.

The data center network 116 may include multiple physical data centers, such as geographically separate data centers. The multiple data centers may be communicatively coupled by a wide-area network, such as the external network 118, which may include one or more of the public Internet, a private wide area network, a multi-protocol label switching (MPLS) network, a frame relay, network, or other.

Although FIG. 1 shows function blocks 102 as being separate from some of the other elements, such as the control and monitoring node 104, storage node 106, management device 112, other resources 114, one or more of these other elements may also be implemented as virtualized resources within the environment 100.

Each virtual resource 108 is provided with a unique identifier (shown in FIG. 1 as an "ID"). In the example illustrated in FIG. 1, virtual network interface card (NIC) port numbers, such as a virtual media access control (MAC) addresses, are shown as the virtual identifiers. But in other examples, other types of identifiers may be used, including network layer addresses, such as internet protocol (IP) addresses, upper-layer protocol identifiers such as Transport Control Protocol (TCP) port numbers, or other computer-readable identifiers (including arbitrary identifiers). The identifiers may be encrypted or otherwise obfuscated so that unauthorized elements in the environment 100 cannot easily identify a physical resource that a particular virtual resource 108 is hosted on. Each instance of a virtual resource in the network is given a port version. Also, as noted above, the control and monitoring node 104 monitors the state of the virtual resources. In some examples, the hypervisors 110 and/or the virtual resources 108 provide status updates to the control and monitoring node 104 via a communication channel, such as via a secured and authenticated communication channel. Such updates include among other things indications that the virtual resources 108 are instantiated, indications that the virtual resources 108 are deleted, as well as execution state information, including running, critical, stopped, and so forth. Such information is included in the policy stores 120 of hypervisors 110 and is provided to the control and monitoring node 104, via one or more communication channels.

A policy store 122 on the control and monitoring node 104, examples of which are shown in the tables below, includes a list of virtual resource identifiers of the virtual resources 108 in the environment 100. The policy store 122 also includes a unique virtualization service (e.g., a hypervisor) identifier, a port version number, and state information for one or more of the virtual resources 108. Although shown as a separate field within the policy store, the port version may, in some examples, be part of the virtual resource identifier, such as the most significant bits of the virtual resource identifier, the least significant bits of the resource identifier, or some other portion of the virtual resource identifier. Likewise, the hypervisor ID may also be incorporated into the virtual resource identifier and/or the port version. Where clusters of virtual machines are tracked, in some examples, the cluster identifiers are tracked (e.g., the virtual resource identifier in the example policy store 122 below includes a cluster identifier, or the policy store 122 includes a separate group identifier as shown in Table elsewhere within this Detailed Description). While in some examples the individual virtual resource identifiers of the virtual resources within the cluster are tracked (e.g., the virtual resource identifier in the example policy store 122 below includes an identifier specific to an individual virtual resource).

TABLE 1

| Virtual Resource Identifier | Hypervisor ID | Port Version | State |
|---|---|---|---|
| 00-03-FF-00-00-01 | 110-1 | 1 | Running |
| 00-03-FF-00-00-05 | 110-2 | 1 | Running |
| 00-03-FF-00-00-01 | 110-3 | 2 | Running |
| ... | ... | ... | ... |

The control and monitoring node 104 determines a candidate virtual resource instance to apply networking connectivity to. This determination is based on the policy store 122 information, including the virtual resource identifier, the port version number, and the state of the virtual resource included in the policy store 122. In the example illustrated by the example policy store 122 shown above, hypervisor 110-1 and hypervisor 110-3 both host a virtual resource having a virtual resource identifier of 00-03-FF-00-00-01. Thus, there are two instances of a virtual resource in the network with the same virtual resource identifier (shown in FIG. 1 as virtual resources 108-1 and 108-3).

In some examples, the control and monitoring node 104 selects the instance of the virtual resource that has the latest port version as the candidate virtual resource instance. In some examples, the control and monitoring node may ignore the state information. Whenever the control and monitoring node 104 receives an update indicating that a virtual resource 108 is deleted from a function block 102, the control and monitoring node 104 may select the instance of the virtual resource 108 which now has the latest port version in the policy store 122 as a new candidate virtual resource. The control and monitoring node may ignore one or more of the virtual resources 108 with the same virtual resource identifiers that have port versions earlier than the most recent port version in the policy store 122.

In some examples, the port versions may be timestamps, such as for example timestamps based on a network time protocol (NTP) in order to provide times based on a common clock, such as a universal time clock. Thus, selecting the "latest" port versions includes identifying the most recent timestamp. In other examples, some algorithm is utilized to assign the port versions, such as an increment function, a decrement function, or some other algorithm. The algorithm has a property that it assigns port versions such that the order in which the port versions are assigned can be determined after the fact. In the example policy store 122 above, the port version "1" for virtual resource identifier 00-03-FF-00-00-01 was assigned earlier than port version "2" for virtual resource identifier 00-03-FF-00-00-01, and thus port version "2" was assigned later, such as (but not necessarily) through a simple increment function. But in some examples, port version "1" may have been assigned later than port version "2," such as (but not necessarily) through a simple decrement function. Other examples are possible without departing from the scope of examples. For example, a table of arbitrary port versions may be stored in the control and monitoring node 104, and each assigned in a specified order, which can be determined by reference to the table.

In the example illustrated in FIG. 1, the virtual resource 108-1 may have been moved, replicated, or failed-over to virtual resource 108-3, thereby resulting in two instances of virtual resources 108 having the same virtual resource identifiers. The actual reason that two instances of a virtual resource 108 have the same virtual resource identifier may not be available to the control and monitoring node 104. This is because the control and monitoring node 104 may not actually be, include, or more generally have access to, the virtualization service that causes the move, replication, or failover of the virtual resources 108. Thus, the control and monitoring node 104 utilizes the data included in the policy store 122 to make its determination.

In some scenarios, the port version may not be sufficient to identify the candidate virtual resource. For example, in the example policy store 122 illustrated in the table below (Table 2), the latest port version corresponds to a virtual resource instance that is in a "critical" state. This may occur, for example, where a human user initiates the move of the virtual resource 108 and generates the port version for the moved instance. Thus, in at least this example, using port versions alone may not result in a determination of a good candidate virtual resource instance.

TABLE 2

| Virtual Resource Identifier | Hypervisor ID | Port Version | State |
| --- | --- | --- | --- |
| 00-03-FF-00-00-01 | 110-1 | 1 | Running |
| 00-03-FF-00-00-05 | 110-2 | 1 | Running |
| 00-03-FF-00-00-01 | 110-3 | 2 | Critical |
| ... | ... | ... | ... |

In some examples, the control and monitoring node 104 utilizes the state information in making its determination of a candidate virtual resource. In some examples, the control and monitoring node identifies the virtual resource that has the latest port version that is also in a running state.

In some examples, the state information is determined based on whether the virtual resources 108 have access to a storage node 106, although other state information may be utilized. In the example illustrated in FIG. 1, the virtual resources 108 access the same storage node 106, but in some examples, the virtual resources may access different storage nodes, and one or more of the virtual resources may access local storage within the function blocks 102.

In some examples, groups of two or more virtual resources 108 may be tracked together, and policies may be applied to such groups as a whole based on identification of a candidate group of virtual resources. Such groups may include a cluster of virtual resources, although other types of virtual resource groups may be tracked in some examples. The control and monitoring node 104 may determine, e.g., by receiving updates, that a group of virtual resources 108 has been instantiated, and also identify that the group of virtual resources 108 is a duplicate group of virtual resources 108. Where duplicate groups of virtual resources 108 are identified, the control and monitoring node 104 may determine a candidate group of virtual resources 108 to which to apply networking connectivity, such as based on port versions, states, or other information.

As noted above with respect to Table 1, the Virtual Resource Identifier may in some examples be a cluster identifier. In the example policy store 122 illustrated in the table below (Table 3), a group identifier field is added to the policy store 122. This enables the control and monitoring node 104 to track both individual virtual resources 108 as well as groups of virtual resources 108. The control and monitoring node 104 may choose as appropriate to the situation and according to policy, a candidate individual virtual resource 108 and/or a candidate group of virtual resources 108 to which to apply networking connectivity.

TABLE 3

| Virtual Resource Identifier | Group Identifier | Hypervisor ID | Port Version | State |
| --- | --- | --- | --- | --- |
| 00-03-FF-00-00-01 | 1 | 110-1 | 1 | Running |
| 00-03-FF-00-00-05 | 2 | 110-2 | 1 | Running |
| 00-03-FF-00-00-01 | 1 | 110-3 | 2 | Critical |
| ... | | ... | ... | ... |

The group identifier may be a cluster identifier or other group identifier, including an arbitrary group identifier. A group of virtual resources 108 may be identified by policy. In some examples, a group of virtual resources 108 may be provided with networking connectivity that allows the virtual resources 108 access, or level of network access, to other virtual resources 108 within the group. This may be used, for example, where the virtual resources 108 within a group are configured to interact with one another, such as to provide an aggregate or common service.

Upon determining the candidate virtual resource instance 108 using one of various methods described herein, the control and monitoring node 104 transmits update communications to the function blocks 102, to update the policy stores 120 in the function blocks 102 to include updated networking policies. Such updated networking policies include networking rules that provide appropriate access to the function block 102 that includes the candidate instance of the virtual resource 108. Such networking policies may include firewall rules, routing paths, network encapsulation information and rules, access control lists, VPN configurations, layer-3 address mapping (e.g., IP address mapping), and generally any networking policy that enables the virtual resource 108 to have access to, and/or be accessed by, other elements in the network. Address mapping in this instance includes mapping a virtual IP address of a virtual resource to an underlying IP address of the function block 102 that hosts the virtual resource. The control and monitoring node 104 may also update other elements in the environment 100, including the other resources 114 and the storage node 106, to include appropriate networking configurations and/or networking policies to achieve the designated communication accessibility in the data center network 116 and/or to the external network 118. Thus, the control and monitoring node 104 may not provide all networking policy updates to all function blocks 102, although it may. Providing updated networking policies may include updating non-virtualized network elements and resources, including conventional and legacy network elements and resources, to include the appropriate networking policy updates and/or configurations.

Where virtual resources 108 are tracked as a group, such as by their group identifier, the virtual resources 108 may be provided with connectivity based at least in part on a group policy, including based on a Windows® Group Policy as well as based on other policies or policy types applied to groups in various embodiments. The control and monitoring node 104 may transmit update communications to the function blocks 102 to update the policy stores 120 to provide connectivity to the virtual resources 108 based at least in part on such group policies. Examples include policies that assign the virtual resources 108 within the group to the same network address segment(s) (e.g., all virtual resources in the group being assigned to one or more common IP subnets), providing the virtual resources 108 within the group with connectivity such that communications between virtual resources 108 meets, exceeds, or falls below one or more predetermined threshold criteria (e.g., a threshold hop count (such as a threshold router hop count), or other protocol metric), providing the virtual resources 108 within the group with certain performance metrics (such as round-trip delay times, jitter, and so forth) for communications between the virtual resources 108 and/or for communications between virtual resources 108 in the group with outside resources.

A common group policy may include security-related policies, such as a policy that indicates that one or more of the virtual resources within the group are allowed to communicate with one another, or to communicate with certain common other resources (e.g., external to the group), including resources within the data center network or via the external network 118. In general, group-based networking policies may include firewall rules, routing paths, encapsulation rules, access control lists, VPN configurations, layer-3 address mapping (e.g., IP address mapping), and generally any networking policy that enables the virtual resources 108 within a group to have access to, and/or be accessed by, other elements in the network. Other example network connectivity arrangement policies may be included without departing from the scope of embodiments.

In some examples, an individual virtual resource 108 may be provided with networking connectivity according to a first policy specified for the individual virtual resource 108 (such as may be identified base on the virtual resource identifier) as well as according to a second policy specified for the group that the individual virtual resource 108 belongs to (such as may be identified based on its group identifier). Thus, a portion of the networking connectivity applied to the virtual resource 108 may be based on a policy associated with the virtual resource 108 as well as based on its group identifier.

In some examples, the control and monitoring node 104 may cause additional networking resources (e.g., additional virtualized resources 108) to be instantiated based on the identification of the candidate virtual resource 108 or candidate virtual resource group. In some examples, the control and monitoring node 104 may cause the additional resources to be instantiated based on the policy, such as for example, based on a policy to provide a certain type of networking function to a candidate virtual resource 108. For example, a firewall, VPN node, router, or other resource may be instantiated to provide the appropriate level of connectivity within the data center network 116. Note that the networking functions may be provided by a newly instantiated one of the virtual resources 108. Thus, a first virtual resource 108 (such as virtual resource 108-1) may be the candidate virtual resource 108 for which a second virtual resource (e.g., virtual resource 108-3) is a duplicate virtual resource (virtual resource 108-3), and a third virtual resource 108 (such as virtual resource 108-2) may be a virtual resource (for example a newly instantiated virtual resource) that provides networking functions for the first virtual resource 108.

In some examples, in a failover or migration situation, additional networking resources (such as the virtual resource 108-2) may be instantiated in order to provide a same or similar level of networking connectivity that the old virtual resources 108 were provided with. In some examples, the control and monitoring node 104 may determine that, at a time prior to a migration or failover of the virtual resources 108, additional networking resources were in the process of being instantiated, or had recently been instantiated, to handle connectivity to the old virtual resources 108. The control and monitoring node 104 may cause such additional networking resources to be instantiated based on that determination. Furthermore, it may be determined by the control and monitoring node 104 that a failover or other migration of the virtual resources 108 was caused in whole or in part by a lack of networking resources available to the virtual resources 108, and may therefore cause additional networking resources to be instantiated to prevent a similar loss or reduced networking connectivity to the newly instantiated virtual resources 108.

The networking policies, once updated to the policy stores 120 in the function blocks 102, configure the protocol stacks 124 of the function blocks 102 to provide the appropriate networking connectivity. The networking policies are provided in some embodiments to the function blocks 102 that include the candidate virtual resources 108. The networking policies may be provided to other function blocks 102, such as the function blocks 102 that include instantiations of virtual networking appliances that provide underlying networking infrastructure services to the data center network 116. The networking policies are provided in some embodiments to the other resources 114, which may include conventional and/or non-virtualized networking hardware components of the data center network 116. The control and monitoring node 104 may provide the policy updates via a push or pull update procedure. In one example, a function block 102 may host a virtualized firewall appliance, and the policy updates include firewall rules that regulate traffic to and from the virtual resource 108. In this example, the virtualized firewall appliance may be a virtual resource 108 within the same or different function block 102 as the virtual resource for which the networking policy is updated. The networking policies may be determined in part based on the function block 102 that the candidate virtual resource 108 instance is determined to reside on. For example, function block 102-1 may be in a different network subnet than function block 102-3. In that case, network encapsulation may be applied to the networking policy to carry traffic to and from the virtual resource 108-3 when the virtual resource 108-3 is determined to be the candidate instance, while no encapsulation is used (or different network encapsulation is used) when the virtual resource 108-1 is determined to be the candidate instance. Other example policies are possible without departing from the scope of examples. Example networking policies follow.

An example firewall policy may be a 5-tuple policy with an action. These firewall policies specify what kind of traffic is allowed or denied for the VM. For example:

Source: 10.0.0.0/24
Destination: 20.0.0.0/24
Protocol: TCP
Source Port: Any
Destination Port: 80 (HTTP)
Action: Deny In network virtualization (VNET), the address present inside the virtual resource is called "customer address" or CA, while the IP address on the host machine that hosts the virtual resource is called "Provider address" or PA. Each CA has corresponding mapping to its PA, which is determined by the host on which that virtual resource is present. When a virtual resource moves from one host machine to another, the mapping changes. This mapping update may be distributed in the entire data center 116, otherwise network connectivity may break. An example VNET policy:

CA=10.0.0.0 on PA 172.2.1.21

Server Load Balancing (SLB) policies include a mapping of Virtual IP address (VIP), and a pool of virtual resource IP addresses called dedicated IP addresses (DIPs). An SLB controller includes agents running on each host machine. Depending on the virtual resource location, the SLB controller distributes SLB policies to the corresponding host. When a virtual resource moves, the SLB controller distributes the load balancing policies to new host. For example:

VIP=10.0.0.100
DIP=20.0.0.100 on host 172.1.1.20

In some examples, the control and monitoring node 104 includes a logging system that tracks updates to the policy store 122, including moves, migrations, and duplications of virtual resources in the network. The logging system may also track determinations of the virtual resources to be provided with connectivity, and instances of networking policies updated within the network, including identification of the selected virtual resources to be provided with connectivity. The logs may in some examples be time-stamped so that events can be reconstructed later.

In examples where the data center network 116 includes multiple data centers, such as geographically separate data centers, the control and monitoring node 104 may track, and receive update communications regarding, virtual resources 108 in two or more data centers within the data center network 116. Thus, migration, failover, or other duplication of virtual resources 108, or group of virtual resources 108, may include instantiating a new virtual resource 108 or group of virtual resources 108 in a data center that is different than the data center in which the original virtual resource 108 or group of virtual resources 108 are instantiated. Instantiations of both new individual virtual resources 108 and new groups of virtual resources 108 in another data center are possible within the scope of the present disclosure. Each data center within the data center network 116 may include one or more separate control and monitoring nodes 104, each with their own copy of the policy store 122. The separate control and monitoring nodes 104 may communicate with one another to share updates from the function blocks 102 within each of their respective data centers. Alternatively, the function blocks 102 may be configured to provide update communications to control and monitoring nodes 104 located in data centers that are different from their own data centers. Other examples are possible without departing from the scope of embodiments.

Figure 2:
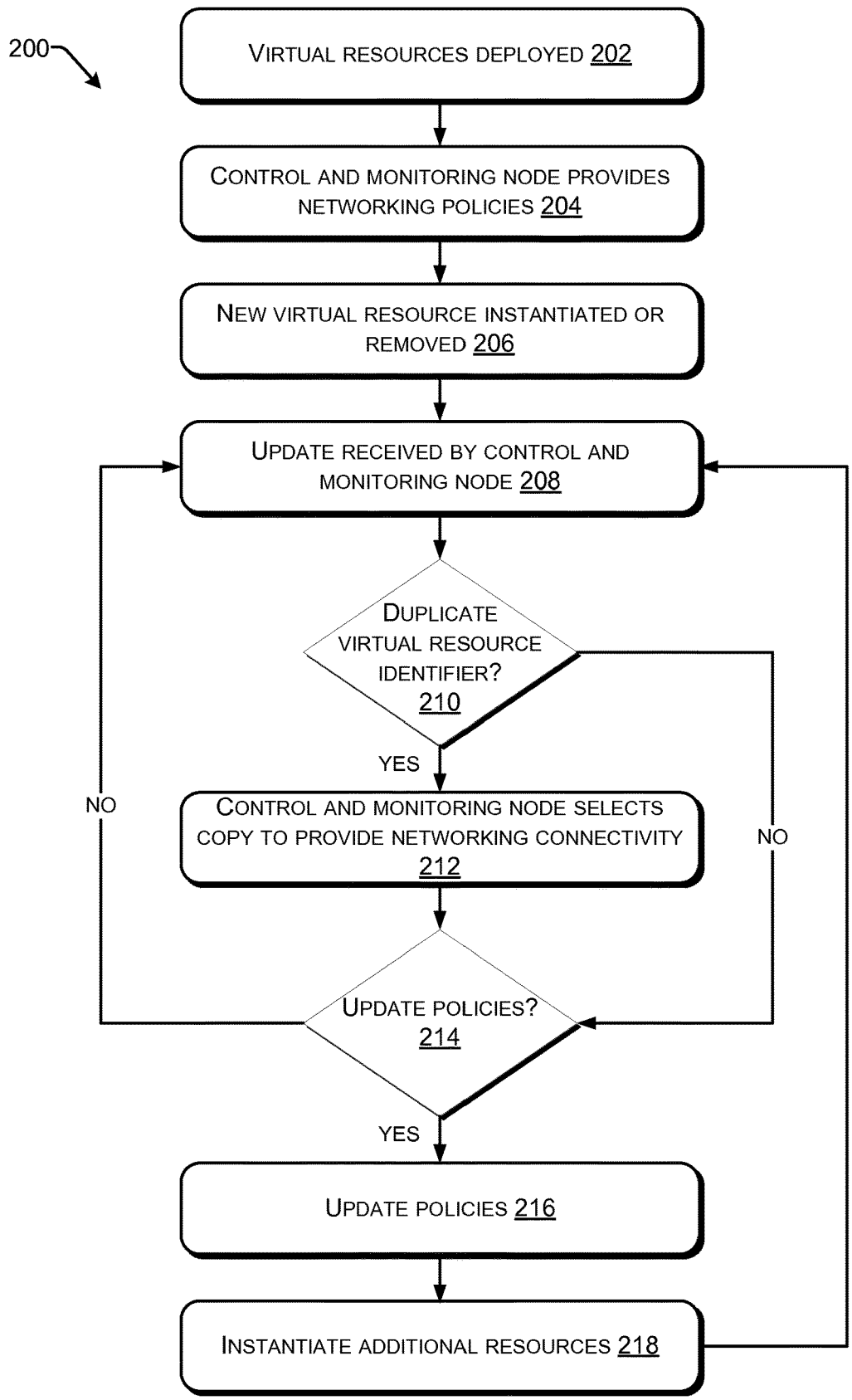
FIG. 2 illustrates an example process for monitoring virtual resources in a network and updating networking policies.

FIG. 2 depicts a flow diagram that shows an example process in accordance with various examples. The operations of this process are illustrated in individual blocks and summarized with reference to those blocks. This process is illustrated as a logical flow graph, each operation of which may represent a set of operations that can be implemented in hardware, software, or a combination thereof. In the context of software, the operations represent computer-executable instructions stored on one or more computer storage media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be combined in any order, separated into sub-operations, and/or performed in parallel to implement the process. Processes according to various examples of the present disclosure may include only some or all of the operations depicted in the logical flow graph.

FIG. 2 illustrates an example process 200 for monitoring virtual resources in a network and updating networking policies in accordance with examples. At 202, virtual resources, such as the virtual resources 108 are deployed on function blocks, such as the function blocks 102 in a data center environment. Along with the deployment of the virtual resources, a control and monitoring node, such as the control and monitoring node 104, receives update communications via a network interface of the computing system on which the control and monitoring node is instantiated. The update communication is provided to the control and monitoring node executing on the computing system via a software protocol stack of the computing system, such as by being passed a pointer to data provided in the update communication, wherein the pointer is stored in an appropriate data structure in memory. The data of the update communication includes virtual resource identifiers, hypervisor identifiers, group identifiers, port versions, and statuses of the virtual resources. The control and monitoring node stores that information in a policy store, such as the policy store 122, which is provided with an appropriate data structure within a computer-readable memory. In some examples, port versions may be generated and/or assigned by the control and monitoring node.

At 204, the control and monitoring node provides, via a software protocol stack, a network interface, and the underlying hardware network (such as the data center network 116), networking policy communications to one or more function blocks in the network. The function blocks are also configured to receive the networking policy communications via network interfaces of the function blocks, and passed to the virtual networking software elements instantiated on the computing systems via software protocol stacks. The networking policies configure or enable the underlying data center network (e.g., the one or more of the virtual networking software elements in the data center network) to provide appropriate connectivity for the virtual resources instantiated in the data center environment.

At 206, a new virtual resource is instantiated in the network. The virtual resource may be another instance of an existing virtual resource already instantiated in the network. The instance may be instantiated for various reasons such as, but not limited to, a migration failure, a manual replication or move, a failover operation, or for other reason.

At 208, the control and monitoring node receives an update communication (e.g., via the hardware network, the network interface, and the software protocol stack) regarding the virtual resources in the network, including the newly instantiated virtual resource. For example, the newly instantiated virtual resource, or other element, provides the update communication to the control and monitoring node. The update communication includes for example, the virtual resource identifier, the hypervisor identifier, group identifier, a port version, and a status of the newly instantiated virtual resource. In some examples, port versions may be generated and/or assigned by the control and monitoring node. The control and monitoring node may also receive an update communication from the old (or earlier instantiated) instance of a virtual resource, the update communication indicating a state change of the virtual resource, such as a change from running to critical, or some other state change.

At 210, the control and monitoring node determines whether the virtual resource is a duplicate, such as based on detecting that the policy store includes two or more entries with the same virtual resource identifier and/or group identifier. An example of this is shown in the example policies above. As noted above, the port version, group identifier, and/or the hypervisor identifier may, in some examples, be part of the virtual resource identifier, although they may be provided and stored separately. Thus, determining a duplicate virtual resource in the network may include determining that a portion of two or more virtual resource identifiers are duplicates, rather than determining that the entirety of the network resource identifiers are duplicates. Other examples are possible without departing from the scope of examples.

Where the virtual resource is a duplicate (the "YES" path), the control and monitoring node at 212 determines from the policy store the candidate instance of the virtual resource to provide networking connectivity to. As described in more detail elsewhere within this Detailed Description, the control and monitoring node determines the candidate virtual resource based at least on the policy store information. This includes in some examples one or more of the virtual resource identifier, the port version, the group identifier, and the state information.

At 214, the control and monitoring node determines whether to update the networking policy to achieve appropriate connectivity to the candidate virtual resource. Where the current policy already provides networking connectivity to the candidate virtual resource, no update may be generated (although it may be in some circumstances). Where the current policy does not currently provide such connectivity, an update may be generated.

At 216, the control and monitoring node updates the policies (in either a push or a pull fashion) to the elements in the data center environment, including the function blocks, other resources (including one or more of virtualized and conventional/non-virtualized networking infrastructure components), storage nodes, and so forth. Where the control and monitoring node determined, at 212 to provide networking connectivity to a candidate virtual resource, the policy update may be usable by the elements in the data center, including the function blocks 102, the other resources 114, etc., to provide the appropriate network connectivity to the candidate instance, while also removing network connectivity to other instance(s) of virtual resources having the same virtual identifier. Updating the policies includes causing update communications including the policy updates to be transmitted to the function blocks in the underlying hardware network. The function blocks receive the update communications via network interfaces, software protocol stacks, and reconfigure themselves based on the policy updates. Reconfiguration of the function blocks may include, in some embodiments, updating routing tables, packet forwarding policies, firewall rules, network address translation rules, encapsulation rules, encryption policies, and so forth.

In some embodiments, the appropriate network connectivity may be based on identification of a group of virtual resources that the candidate instance belongs to, such as may be identified using a group identifier of the candidate instance. Group-based network connectivity provided by the update policies may include providing the candidate instance with appropriate network address assignments (such as placing the candidate instance in the same subnet or subnets as other virtual resources in the group), providing virtual resources in the group, including the candidate instance, with communication that meets certain threshold criteria (such as a maximum router hop count or other), providing the virtual resources in the group, including the candidate instance, with communications that meet certain network performance metrics (such as delay, jitter, etc.). Other examples are possible without departing from the scope of embodiments.

At 218, the control and monitoring node may cause one or more additional networking resources to be instantiated to provide the appropriate network connectivity. For example, the control and monitoring node may transmit a request communication to a virtual resource controller to cause additional resources to be instantiated on various function blocks. The additional networking resources may include virtualized networking resources. The additional networking resources may be instantiated based on the connectivity that is to be provided to the candidate instance of the virtual resource. The one or more additional resources may be instantiated in order to provide networking criteria (such as a hop count, etc.), networking performance metrics (such as delay, jitter, reliability, and so forth), or other.

In a failover or migration situation, the additional networking resources may be instantiated based on providing a same or similar level of networking connectivity that the old virtual resources were being provided with. The control and monitoring node may determine that, at a time prior to a migration or the failover of the virtual resources, additional networking resources were being instantiated, or had been instantiated, to provide connectivity to the old virtual resources and the control and monitoring node may cause such additional networking resources to be instantiated based on that determination. Furthermore, it may be determined by the control and monitoring node that a failover or other migration of the virtual resources was caused in whole or in part by a lack of networking resources, and may therefore cause additional networking resources to be instantiated to prevent a similar loss or reduced networking connectivity to the newly instantiated virtual resources.

The process may repeat as additional virtual resources are deployed or removed from the network. Where a transient issue has caused multiple virtual resources having the same virtual resource identifier to be included in the policy store, resolution of the transient issue may result in one or more of the virtual resources being removed from the network, or result in a status change for one or more of the duplicate virtual resources. Such changes may cause the control and monitoring node to determine a different candidate virtual resource to provide connectivity to. The control and monitoring node may clean up the policies with respect to any virtual resources that are taken offline or otherwise deleted from the network.

FIG. 3 is a block diagram of an example computing system 300 usable to implement virtual resource monitoring and networking policy updates. Computing system 300 may be deployed in a shared network environment, including in a datacenter, a cloud computing environment, or other network of computing devices. According to various non-limiting examples, the computing system 300 includes one or more devices, such as servers, storage devices, and networking equipment. In one example configuration, the computing system 300 comprises at least one processor 302. The computing system 300 also contains communication connection(s) 306 that allow communications with various other systems. The computing system 300 also includes one or more input devices 308, such as a keyboard, mouse, pen, voice input device, touch input device, etc., and one or more output devices 310, such as a display (including a touch-screen display), speakers, printer, etc. coupled communicatively to the processor(s) 302 and the computer-readable media 304 via connections 312.

Computer-readable media 304 stores computer-executable instructions that are loadable and executable on the processor(s) 302, as well as data generated during execution of, and/or usable in conjunction with, these programs. In the illustrated example, computer-readable media 304 stores operating system instances 314, which provide basic system functionality to the control and monitoring node 104, the storage node 106, the virtual resource(s) 108, the hypervisor(s) 110, the policy store(s) 120, the policy store 122, and the protocol stack(s) 124. One or more of the operating system instances 314 may be instantiated as virtual machines under one or more hypervisors 110.

The computer-readable media 304 also stores a logging system 316 that tracks updates to the policy store 122, including moves, migrations, and duplications of virtual resources in the network. The logging system may also track determinations of the candidate virtual resources to be provided with connectivity, and instances of networking policies updated within the network, including identification of the selected virtual resources to be provided with connectivity. The logs may in some examples be time-stamped so that events can be reconstructed later.

Processor(s) 302 may include one or more single-core processing unit(s), multi-core processing unit(s), central processing units (CPUs), graphics processing units (GPUs), general-purpose graphics processing units (GPGPUs), or hardware logic components configured, e.g., via specialized programming from modules or application program interfaces (APIs), to perform functions described herein. In alternative examples one or more functions of the present disclosure may be performed or executed by, and without limitation, hardware logic components including Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Digital Signal Processing unit(s) (DSPs), and other types of customized processing unit(s). For example, a processing unit configured to perform one or more of the functions described herein may represent a hybrid device that includes a CPU core embedded in an FPGA fabric. These or other hardware logic components may operate independently or, in some instances, may be driven by a CPU. In some examples, examples of the computing system 300 may include a plurality of processing units of multiple types. For example, the processing units may be a combination of one or more GPGPUs and one or more FPGAs. Different processing units may have different execution models, e.g., as is the case for graphics processing units (GPUs) and central processing units (CPUs).

Depending on the configuration and type of computing device used, computer-readable media 304 include volatile memory (such as random access memory (RAM)) and/or non-volatile memory (such as read-only memory (ROM), flash memory, etc.). The computer-readable media 304 can also include additional removable storage and/or non-removable storage including, but not limited to, SSD (e.g., flash memory), HDD (Hard Disk Drive) storage or other type of magnetic storage, optical storage, and/or other storage that can provide non-volatile storage of computer-executable instructions, data structures, program modules, and other data for computing system 300.

Computer-readable media 304 can, for example, represent computer memory, which is a form of computer storage media. Computer-readable media includes at least two types of computer-readable media, namely computer storage media and communications media. Computer storage media includes volatile and non-volatile, removable and non-removable media implemented in any process or technology for storage of information such as computer-executable instructions, data structures, programming modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other medium that can be used to store information for access and retrieval by a computing device. In contrast, communication media can embody computer-executable instructions, data structures, program modules, or other data in a modulated data signal, such as a carrier wave, or other transmission mechanism. As defined herein, computer storage media does not include communication media.

Example Clauses

Clause A. A computing system, comprising one or more processors, memory; and one or more programming modules stored on the memory and executable by the one more processors to perform acts. The acts comprise monitoring and providing policies to a plurality of resources in a network, determining that at least two or more of the plurality of resources are duplicates of each other in response to the determining, selecting a selected resource from the at least two or more of the plurality of resources to provide networking connectivity to within the network, and providing network configuration updates to one or more networking resources in the network, the network configuration updates providing the networking connectivity to the selected resource.

Clause B. The computing system of clause A, the selecting comprises selecting the selected resource based at least in part on port versions of the at least two or more of the plurality of resources.

Clause C. The computing system of either of clause A or B, the selecting comprises selecting the selected resource based at least in part on statuses of the at least two or more of the plurality of resources, wherein the statuses are based at least in part on connectivity to a storage node.

Clause D. The computing system of any of clauses A-C, wherein the selecting comprises selecting the selected resource and another selected resource of the at least two or more of the plurality of resources to provide networking connectivity to.

Clause E. The computing system of clause A, wherein the selecting comprises selecting the selected resource based at least in part on port versions of the at least two or more of the plurality of resources, and statuses of the at least two or more of the plurality of resources.

Clause F. The computing system of any of clauses A-E, wherein the plurality of resources includes one or more resources selected from a group consisting of virtual machines, physical machines, and software containers.

Clause G. The computing system of any of clauses A-F, wherein the providing network configuration updates further comprises providing one or more updates selected from a group consisting of firewall rules, routing information, switching information, access control lists, network encapsulation configuration, and mapping of virtual network addresses to underlying network addresses.

Clause H. The computing system of any of clauses A-G, wherein the acts further comprise selecting the network configuration updates provided to the one or more networking resources within the network based at least in part on networking connectivity to be provided to a group of virtual resources that the selected resource belongs to.

Clause I. The computing system of any of clauses A-H, wherein the group of virtual resources that the selected resource belongs to is identified based at least on a group identifier of the selected resource, the group identifier tracked separately from a virtual resource identifier of the selected resource.

Clause J. A method of monitoring virtual resources in a data center environment and providing network connectivity, the method comprising tracking a plurality of virtual resources in a network, determining that at least two of the plurality of virtual resources are duplicates of one another, determining a selected virtual resource of the at least two of the plurality of virtual resources to provide networking connectivity to within the network, and providing network configuration updates to one or more networking resources within the network. The network configuration updates enable the one or more networking resources within the network to provide the networking connectivity to the selected virtual resource.

Clause K. The method of clause J, wherein the determining the selected virtual resource to provide networking connectivity to within the network is based at least on port versions of the at least two of the plurality of virtual resources.

Clause L. The method of either of clause J or K, wherein the determining the selected virtual resource to provide networking connectivity to within the network is based at least on statuses of the at least two of the plurality of virtual resources, wherein the statuses are based at least in part on connectivity to at least one storage node.

Clause M. The method of clause J, wherein the determining the selected virtual resource to provide networking connectivity to within the network is based at least on port versions of the at least two of the plurality of virtual resources, and statuses of the at least two of the plurality of virtual resources.

Clause N. The method of any of clauses J-M, wherein the tracking the plurality of virtual resources includes tracking resource identifiers of at least a first virtual resource of the plurality of virtual resources and a second virtual resource of the plurality of virtual resources, and tracking group identifiers of at least the first virtual resource and the second virtual resource, and wherein the method further comprises selecting the networking configuration updates provided to the one or more networking resources within the network based at least in part on networking connectivity to be provided to a group of virtual resources that the selected virtual resource belongs to.

Clause O. A data center system comprising a plurality of physical machines configured to provide a plurality of function blocks that each host one or more of a plurality of resources, a control and monitoring node deployed on a computing system. The control and monitoring node is configured to monitor the plurality of resources, determine that at least two of the plurality of resources are duplicates of one another, determine that a selected resource of the at least two of the plurality of resources is to be provided with networking connectivity within the network, and communicate network configuration updates to one or more networking resources within the network. The one or more networking resources are comprised in one or more of the plurality of function blocks and, the network configuration updates provide the networking connectivity to the selected resource.

Clause P. The data center system of clause O, wherein the data center system further comprises a plurality of control and monitoring nodes including the control and monitoring node, and a plurality of data centers that are geographically separated. Individual ones of the plurality of control and monitoring nodes being associated with corresponding data centers of the plurality of data centers, and the plurality of data centers being communicatively connected via one or more networks.

Clause Q. The data center system of either of clauses O or P, wherein the control and monitoring node is further configured to determine that the selected resource is to be provided with networking connectivity within the network based at least in part on port versions of the at least two of the plurality of resources, and statuses of the at least two of the plurality of resources.

Clause R. The data center system of any of clauses O-Q, wherein the plurality of resources include a plurality of virtual resources, the network configuration updates include mapping of at least one virtual network address of at least one of the plurality of virtual resources to at least one underlying network address of at least one of the plurality of function blocks.

Clause S. The data center system of any of clauses O-R, wherein the control and monitoring node is further configured to cause one or more additional networking resources to be instantiated within the network, the network configuration updates also pushed to the one or more additional networking resources to provide the selected resource with the networking connectivity.

Clause T. The data center system of any of clauses O-S, wherein the control and monitoring node is further configured to determine the networking configuration updates based at least in part on networking connectivity to be provided to a group of virtual resources that the selected resource belongs to. The group of virtual resources identifiable based on a group identifier associated with the selected resource.

Clause U. A computing system, comprising means for monitoring and providing policies to a plurality of resources in a network, means for determining that at least two or more of the plurality of resources are duplicates of each other, means for selecting in response to determining a selected resource from the at least two or more of the plurality of resources to provide networking connectivity to within the network, and means providing network configuration updates to one or more networking resources in the network, the network configuration updates providing the networking connectivity to the selected resource.

Clause V. The computing system of clause U, the means selecting comprises means for selecting the selected resource based at least in part on port versions of the at least two or more of the plurality of resources.

Clause W. The computing system of either of clause U or V, the means for selecting comprises means for selecting the selected resource based at least in part on statuses of the at least two or more of the plurality of resources, wherein the statuses are based at least in part on connectivity to a storage node.

Clause X. The computing system of any of clauses U-X, wherein the means for selecting comprises means for selecting the selected resource and another selected resource of the at least two or more of the plurality of resources to provide networking connectivity to.

Clause Y. The computing system of clause U, wherein the means for selecting comprises means for selecting the selected resource based at least in part on port versions of the at least two or more of the plurality of resources, and statuses of the at least two or more of the plurality of resources.

Clause Z. The computing system of any of clauses U-Y, wherein the plurality of resources includes one or more resources selected from a group consisting of virtual machines, physical machines, and software containers.

Clause AA. The computing system of any of clauses U-AA, wherein the means for providing network configuration updates further comprises means for providing one or more updates selected from a group consisting of firewall rules, routing information, switching information, access control lists, network encapsulation configuration, and mapping of virtual network addresses to underlying network addresses.

Clause AB. The computing system of any of clauses U-AB, further comprising means for selecting the network configuration updates provided to the one or more networking resources within the network based at least in part on networking connectivity to be provided to a group of virtual resources that the selected resource belongs to.

Clause AC. The computing system of any of clauses U-AC, further comprising means for identifying the group of virtual resources that the selected resource belongs to based at least on a group identifier of the selected resource, the group identifier tracked separately from a virtual resource identifier of the selected resource.

CONCLUSION

Although the techniques have been described in language specific to structural features and/or methodological acts, it is to be understood that the appended claims are not necessarily limited to the features or acts described. Rather, the features and acts are described as example implementations.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A computing system, comprising:
one or more processors;
memory; and
one or more instructions stored on the memory and executable by the one more processors to configure the computing system to:
monitor and provide policies to a plurality of virtual resources in a network;
identify two or more of the plurality of virtual resources that separately persist within the network and that comprise identical virtual resource identifiers;
in response to the identifying, select a selected virtual resource from the two or more of the plurality of virtual resources that separately persist within the network and that comprise identical virtual resource identifiers to provide networking connectivity to within the network, the selecting comprising:
determining a most recently instantiated virtual resource of the two or more of the plurality of virtual resources that separately persist within the network and that comprise identical virtual resource identifiers; and
selecting the most recently instantiated virtual resource as the selected virtual resource; and
provide network configuration updates to one or more networking resources in the network, the network configuration updates providing the networking connectivity to the selected virtual resource.

2. The computing system of claim 1, the selecting comprises selecting the selected virtual resource further based on metadata that includes, at least in part, port versions of the at least two or more of the plurality of virtual resources.

3. The computing system of claim 1, the selecting comprises selecting the selected virtual resource further based on metadata that includes, at least in part, statuses of the at least two or more of the plurality of virtual resources, wherein the statuses are based at least in part on connectivity to a storage node.

4. The computing system of claim 1, wherein the selecting comprises selecting the selected virtual resource further based on metadata that includes, at least in part:
port versions of the at least two or more of the plurality of virtual resources; and
statuses of the at least two or more of the plurality of virtual resources.

5. The computing system of claim 1, wherein the plurality of virtual resources includes one or more resources selected from a group consisting of virtual machines, physical machines, and software containers.

6. The computing system of claim 1, wherein the providing network configuration updates further comprises providing one or more updates selected from a group consisting of firewall rules, routing information, switching information, access control lists, network encapsulation configuration, and mapping of virtual network addresses to underlying network addresses.

7. The computing system of claim 1, wherein the instructions are executable by the one or more processors to configure the computing system to select the network configuration updates provided to the one or more networking resources within the network based at least in part on networking connectivity to be provided to a group of virtual resources that the selected virtual resource belongs to.

8. The computing system of claim 7, wherein the group of virtual resources that the selected virtual resource belongs to is identified based at least on a group identifier of the selected resource, the group identifier tracked separately from the virtual resource identifier of the selected resource.

9. A method of monitoring virtual resources in a data center environment and providing network connectivity, the method comprising:
   tracking a plurality of virtual resources in a network;
   identifying that at least two of the plurality of virtual resources are duplicates of one another by determining that the at least two of the plurality of virtual resources separately persist within the network and comprise identical virtual resource identifiers;
   determining a selected virtual resource of the at least two of the plurality of virtual resources that separately persist within the network and that comprise identical resource identifiers to provide networking connectivity to within the network, the selection comprising:
      determining a most recently instantiated virtual resource of the at least two of the plurality of virtual resources that is also in a running state; and
      selecting the most recently instantiated virtual resource that is also in the running state as the selected virtual resource; and
   providing network configuration updates to one or more networking resources within the network, the network configuration updates enabling the one or more networking resources within the network to provide the networking connectivity to the selected virtual resource.

10. The method of claim 9, wherein the determining the selected virtual resource to provide networking connectivity to within the network is further based at least on metadata that includes port versions of the at least two of the plurality of virtual resources.

11. The method of claim 9, wherein the determining the selected virtual resource to provide networking connectivity to within the network is further based at least on metadata that includes statuses of the at least two of the plurality of virtual resources, wherein the statuses are based at least in part on connectivity to at least one storage node.

12. The method of claim 9, wherein the determining the selected virtual resource to provide networking connectivity to within the network is further based at least on metadata that includes:
   port versions of the at least two of the plurality of virtual resources; and
   statuses of the at least two of the plurality of virtual resources.

13. The method of claim 9, wherein the tracking the plurality of virtual resources includes tracking resource identifiers of at least a first virtual resource of the plurality of virtual resources and a second virtual resource of the plurality of virtual resources, and tracking group identifiers of at least the first virtual resource and the second virtual resource, and wherein the method further comprises selecting the networking configuration updates provided to the one or more networking resources within the network based at least in part on networking connectivity to be provided to a group of virtual resources that the selected virtual resource belongs to.

14. A data center system comprising:
   a plurality of physical machines configured to provide a plurality of function blocks that each host one or more of a plurality of resources;
   a control and monitoring node deployed on a computing system, the control and monitoring node configured to:
   monitor the plurality of resources;
   determine that at least two of the plurality of resources are duplicates of one another by determining that the at least two of the plurality of resources separately persist within a network and comprise identical resource identifiers;
   determine that a selected resource of the at least two of the plurality of resources that separately persist within the network and comprise identical resource identifiers is to be provided with networking connectivity within the network, the selected resource being chosen based on determining that the selected resource is connected to at least one storage node; and
   communicate network configuration updates to one or more networking resources within the network, wherein the one or more networking resources are comprised in one or more of the plurality of function blocks and, wherein the network configuration updates provide the networking connectivity to the selected resource.

15. The data center system of claim 14, wherein the data center system further comprises:
   a plurality of control and monitoring nodes including the control and monitoring node; and
   a plurality of data centers that are geographically separated, individual ones of the plurality of control and monitoring nodes being associated with corresponding data centers of the plurality of data centers, and the plurality of data centers being communicatively connected via one or more networks.

16. The data center system of claim 14, wherein the control and monitoring node is further configured to determine that the selected resource is to be provided with networking connectivity within the network further based at least in part on metadata including at least:
   port versions of the at least two of the plurality of resources; and
   statuses of the at least two of the plurality of resources.

17. The data center system of claim 14, wherein the plurality of resources include a plurality of virtual resources, the network configuration updates include mapping of at least one virtual network address of at least one of the plurality of virtual resources to at least one underlying network address of at least one of the plurality of function blocks.

18. The data center system of claim 14, wherein the control and monitoring node is further configured to cause one or more additional networking resources to be instantiated within the network, the network configuration updates also pushed to the one or more additional networking resources to provide the selected resource with the networking connectivity.

19. The data center system of claim 14, wherein the control and monitoring node is further configured to determine the networking configuration updates based at least in part on networking connectivity to be provided to a group of virtual resources that the selected resource belongs to, the group of virtual resources identifiable based on a group identifier associated with the selected resource.

20. The computing system of claim 1, wherein determining that the two or more virtual resources are duplicates includes comparing a virtual resource identifier for each of the two or more virtual resources.

* * * * *